(12) United States Patent
Gao et al.

(10) Patent No.: US 8,368,698 B2
(45) Date of Patent: Feb. 5, 2013

(54) CALCULATING A WEBPAGE IMPORTANCE FROM A WEB BROWSING GRAPH

(75) Inventors: Bin Gao, Beijing (CN); Tie-Yan Liu, Beijing (CN); Hang Li, Beijing (CN); Yuting Liu, Beijing (CN)

(73) Assignee: Microsoft Corporation, Redmond, WA (US)

( * ) Notice: Subject to any disclaimer, the term of this patent is extended or adjusted under 35 U.S.C. 154(b) by 774 days.

(21) Appl. No.: 12/236,516

(22) Filed: Sep. 24, 2008

(65) Prior Publication Data

US 2010/0073374 A1 Mar. 25, 2010

(51) Int. Cl.
*G06T 11/20* (2006.01)
*G06F 3/00* (2006.01)

(52) U.S. Cl. ........................................ 345/440; 715/700

(58) Field of Classification Search .................. 345/440; 715/700
See application file for complete search history.

(56) References Cited

U.S. PATENT DOCUMENTS

| | | | |
|---|---|---|---|
| 6,847,967 B1 | 1/2005 | Takano | |
| 7,076,483 B2 | 7/2006 | Preda et al. | |
| 7,260,573 B1 * | 8/2007 | Jeh et al. | 707/708 |
| 7,475,067 B2 * | 1/2009 | Clary et al. | 1/1 |
| 2003/0128233 A1 * | 7/2003 | Kasriel | 345/738 |
| 2003/0130982 A1 * | 7/2003 | Kasriel et al. | 707/1 |
| 2005/0060297 A1 | 3/2005 | Najork | |
| 2005/0071465 A1 | 3/2005 | Zeng et al. | |
| 2005/0273730 A1 * | 12/2005 | Card et al. | 715/853 |
| 2006/0041553 A1 * | 2/2006 | Paczkowski et al. | 707/7 |
| 2006/0095430 A1 | 5/2006 | Zeng et al. | |
| 2006/0294124 A1 | 12/2006 | Cho | |
| 2007/0182743 A1 * | 8/2007 | Aguera y Arcas | 345/440 |
| 2007/0198504 A1 | 8/2007 | Feng et al. | |
| 2007/0214108 A1 | 9/2007 | Liu et al. | |
| 2008/0075014 A1 | 3/2008 | Jiang | |
| 2008/0313168 A1 * | 12/2008 | Liu et al. | 707/5 |
| 2010/0145771 A1 * | 6/2010 | Fligler et al. | 705/10 |

OTHER PUBLICATIONS

Tsuyoshi Murata and Kota Saito, "Extracting User's Interests from Web Log Data", Proceedings of the 2006 IEEE/WIC/ACM International Conference on Web Intelligence (WI '06), Washington, DC, USA, pp. 343-346.*
Magdalini Eirinaki and Michalis Vazirgiannis, "Web Site Personalization Based on Link Analysis and Navigational Patterns", ACM Transactions on Internet Technology, vol. 7, No. 4, Article 21, 2007.*
Taher H. Haveliwala, "Efficient Computation of PageRank", Oct. 18, 1999, 15 Pages.

(Continued)

*Primary Examiner* — James A Thompson
*Assistant Examiner* — Fikru Gennene
(74) *Attorney, Agent, or Firm* — Lyon & Harr, LLP; Mark A. Watson (57) ABSTRACT

Method for creating a graph representing web browsing behavior, including receiving web browsing behavior data from one or more web browsers; adding a node on the graph for each web page listed in the web browsing behavior data; adding a first link connecting two or more nodes on the graph, wherein the first link representing a hyperlink for accessing a webpage; calculating an amount of time in which each web page is being accessed; determining a number of units of time in the calculated amount of time; adding one or more virtual nodes to the graph based on the number of units of time; and adding a second link connecting two or more virtual nodes on the graph, wherein the second link representing a virtual hyperlink for accessing a webpage.

14 Claims, 7 Drawing Sheets

OTHER PUBLICATIONS

Luxenburger, et al., "Exploiting Community Behavior for Enhanced Link Analysis and Web Search", in Proceedings of WebDB-06, 2006, pp. 8-13.

Agichtein, et al., "Improving Web Search Ranking by Incorporating User Behavior Information", SIGIR'06, Aug. 6-11, 2006, Seattle, Washington, USA., 8 Pages.

Peng, et al., "Ranking Web Search Results from Personalized Perspective", Proceedings of the 8th IEEE International Conference on E-Commerce Technology and the 3rd IEEE International Conference on Enterprise Computing, E-Commerce, and E-Services (CEC/EEE'06), 2006, 8 Pages.

Page, et al., "The PageRank Citation Ranking: Bringing Order to the Web", Jan. 29, 1998, 17 Pages.

Jon M. Kleinberg, "Authoritative Sources in a Hyperlinked Environment", Proc. 9th ACM-SIAM Symposium on Discrete Algorithms, 1998, 34 Pages.

* cited by examiner

CALCULATING A WEBPAGE IMPORTANCE FROM A WEB BROWSING GRAPH

BACKGROUND

Search services currently use conventional link analysis algorithms to compute the importance of a particular web page. The input data for link analysis algorithms are obtained from link graphs which represent the web pages and the hyperlinks that link to those particular web pages. The link analysis algorithms employ a discrete-time Markov process to model the behavior of a web user given the web pages and links listed in a link graph. Unfortunately, link graphs may not accurately represent the importance of each webpage because links can be easily added and deleted by webmasters. Some webmasters even create web pages with link spam, different link functions, and other crawling strategies that may skew the calculation of the importance of a webpage.

SUMMARY

Described herein are implementations of various technologies for calculating a webpage importance using a web browsing graph. The web browsing graph may be used to model the web browsing behavior of web users. The web browsing graph may be created as follows.

In one implementation, a web page importance application may receive data from the web users that may describe their web browsing behavior. Using the web browsing behavior data, the web page importance application may reorganize the data into a browsing thread that may display an identification number of the user's machine in which the data has been obtained from, a list of Universal Resource Locator (URL) addresses that the user has accessed from his machine, a time at which each URL address was accessed, and the manner in which the user accessed each URL address (via hyperlink or URL address entry).

After creating the browsing thread for each user, the web page importance application may create a browsing graph. Initially, the browsing graph may be blank, but the web page importance application may use the browsing thread to add nodes and lines or links to the browsing graph.

A node (denoted by a circle) may be created on the browsing graph for each URL address listed in each browsing thread. In one implementation, only one node may be created for each specific URL address. If a URL address was accessed after the user clicked a hyperlink from a different webpage, a line or link may be drawn from the node which represents the URL address having the hyperlink to the node that represents the accessed URL address. The link may point to the destination URL address. The browsing graph may be stored on a browsing graph file. In addition to the browsing graph, the time in which each URL address was accessed by each machine may also be stored in the metadata portion of the browsing graph file.

In order to represent the web users' staying time on a particular webpage; virtual nodes or self-loops may be added to the newly created browsing graph. In one implementation, the web page importance application may calculate the time in which each webpage was being used by analyzing the time data stored in the metadata of the browsing graph file. The web page importance application may then establish that each node in the browsing graph may represent a certain amount of time in which a web user may have been accessing a webpage.

Since each node on the browsing graph represents an amount of time, a number of virtual nodes may be added to the browsing graph to represent the total duration of time in which a web user may have been accessing a particular webpage. A link may then be added from the original node to a first virtual node to represent a web user's action of staying on a particular webpage for one second then clicking a hyperlink to the same webpage and staying on that webpage for another second. The web page importance application may continue connecting each added virtual node together until the time in which the user stayed on the webpage represented by the virtual node has been indicated on the browsing graph.

Similarly, the computer program may add self-loops to a node on the browsing graph to represent the time in which a web user was accessing a particular webpage. Each self-loop may represent a web user's action in accessing the same webpage again after the established unit of time expired. Self-loops may be indicated on the browsing graph as arrows that originate and end at the same node.

The browsing graph with virtual nodes or self-loops may then be used as an input into a link analysis algorithm to determine the importance of each node or the corresponding webpage. The link analysis algorithm may evaluate the number of links in the graph to determine the importance of each webpage. The browsing graph with virtual nodes or self-loops may indirectly incorporate the time in which a web user stays on a webpage into the link analysis algorithm by adding the links to the virtual nodes or self-loops to original nodes.

The above referenced summary section is provided to introduce a selection of concepts in a simplified form that are further described below in the detailed description section. The summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

In general, one or more implementations described herein are directed to creating a graph to model the web browsing behavior of one or more web users. One or more implementations of various techniques for calculating webpage importance will now be described in more detail with reference to FIGS. 1-7 in the following paragraphs.

Implementations of various technologies described herein may be operational with numerous general purpose or special purpose computing system environments or configurations. Examples of well known computing systems, environments, and/or configurations that may be suitable for use with the various technologies described herein include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The various technologies described herein may be implemented in the general context of computer-executable instructions, such as program modules, being executed by a computer. Generally, program modules include routines, programs, objects, components, data structures, etc. that performs particular tasks or implement particular abstract data types. The various technologies described herein may also be implemented in distributed computing environments where tasks are performed by remote processing devices that are linked through a communications network, e.g., by hardwired links, wireless links, or combinations thereof. In a distributed computing environment, program modules may be located in both local and remote computer storage media including memory storage devices.

Figure 1:
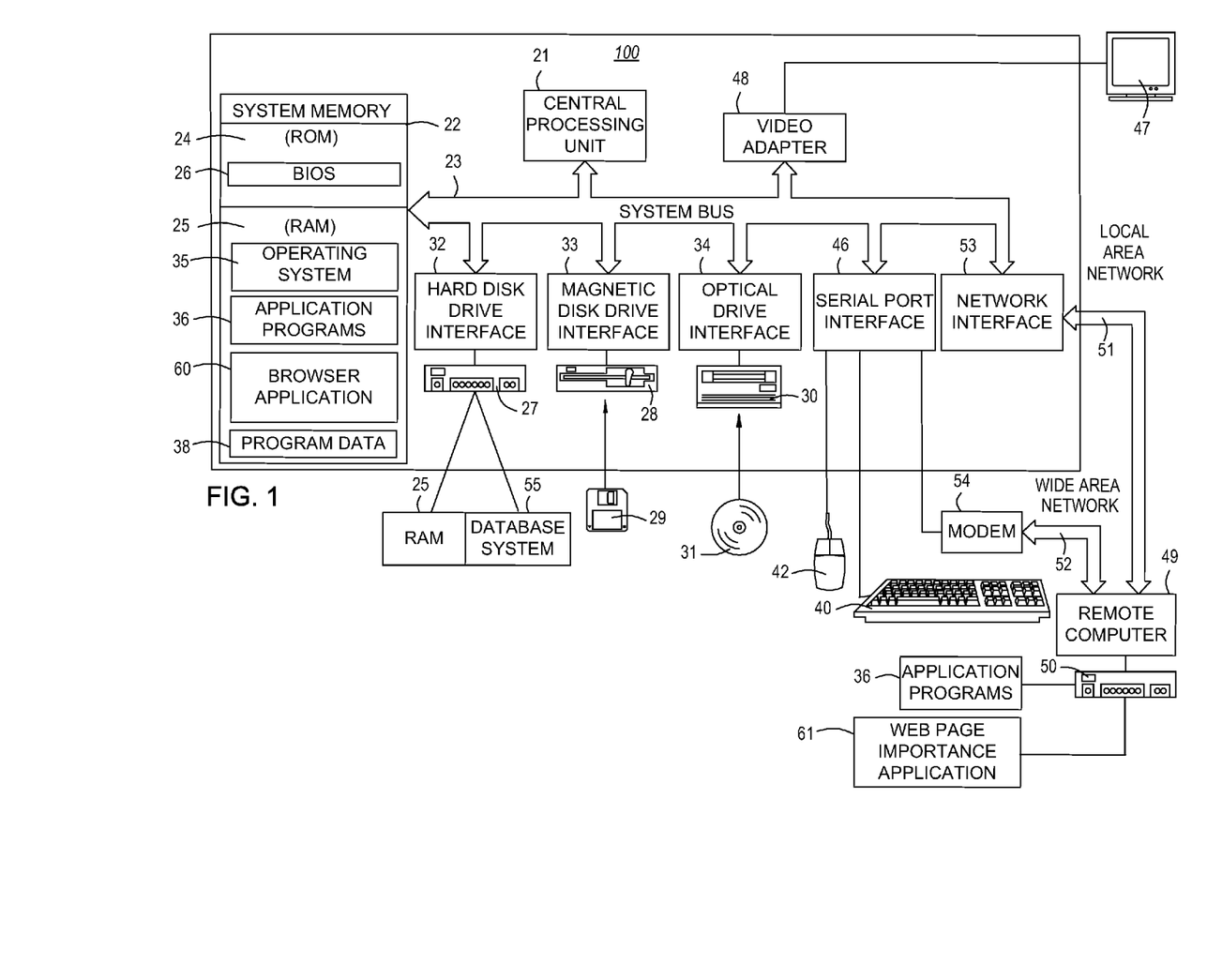
FIG. 1 illustrates a schematic diagram of a computing system in which the various techniques described herein may be incorporated and practiced.

FIG. 1 illustrates a schematic diagram of a computing system 100 in which the various technologies described herein may be incorporated and practiced. Although the computing system 100 may be a conventional desktop or a server computer, as described above, other computer system configurations may be used.

The computing system 100 may include a central processing unit (CPU) 21, a system memory 22 and a system bus 23 that couples various system components including the system memory 22 to the CPU 21. Although only one CPU is illustrated in FIG. 1, it should be understood that in some implementations the computing system 100 may include more than one CPU. The system bus 23 may be any of several types of bus structures, including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. The system memory 22 may include a read only memory (ROM) 24 and a random access memory (RAM) 25. A basic input/output system (BIOS) 26, containing the basic routines that help transfer information between elements within the computing system 100, such as during start-up, may be stored in the ROM 24.

The computing system 100 may further include a hard disk drive 27 for reading from and writing to a hard disk, a magnetic disk drive 28 for reading from and writing to a removable magnetic disk 29, and an optical disk drive 30 for reading from and writing to a removable optical disk 31, such as a CD ROM or other optical media. The hard disk drive 27, the magnetic disk drive 28, and the optical disk drive 30 may be connected to the system bus 23 by a hard disk drive interface 32, a magnetic disk drive interface 33, and an optical drive interface 34, respectively. The drives and their associated computer-readable media may provide nonvolatile storage of computer-readable instructions, data structures, program modules and other data for the computing system 100.

Although the computing system 100 is described herein as having a hard disk, a removable magnetic disk 29 and a removable optical disk 31, it should be appreciated by those skilled in the art that the computing system 100 may also include other types of computer-readable media that may be accessed by a computer. For example, such computer-readable media may include computer storage media and communication media. Computer storage media may include volatile and non-volatile, and removable and non-removable media implemented in any method or technology for storage of information, such as computer-readable instructions, data structures, program modules or other data. Computer storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the computing system 100. Communication media may embody computer readable instructions, data structures, program modules or other data in a modulated data signal, such as a carrier wave or other transport mechanism and may include any information delivery media. The term "modulated data signal" may mean a signal that has one or more of its characteristics set or changed in such a manner as to encode information in the signal. By way of example, and not limitation, communication media may include wired media such as a wired network or direct-wired connection, and wireless media such as acoustic, RF, infrared and other wireless media. Combinations of any of the above may also be included within the scope of computer readable media.

A number of program modules may be stored on the hard disk 27, magnetic disk 29, optical disk 31, ROM 24 or RAM 25, including an operating system 35, one or more application programs 36, a browser application 60, program data 38, and a database system 55. The operating system 35 may be any suitable operating system that may control the operation of a networked personal or server computer, such as Windows® XP, Mac OS® X, Unix-variants (e.g., Linux® and BSD®), and the like. The browser application 60 may be a web browsing software that may be capable of recording the browsing activity of its user. The browser application 60 will be described in more detail with reference to FIGS. 2 in the paragraphs below.

A user may enter commands and information into the computing system 100 through input devices such as a keyboard 40 and pointing device 42. Other input devices may include a microphone, joystick, game pad, satellite dish, scanner, or the like. These and other input devices may be connected to the CPU 21 through a serial port interface 46 coupled to system bus 23, but may be connected by other interfaces, such as a parallel port, game port or a universal serial bus (USB). A monitor 47 or other type of display device may also be connected to system bus 23 via an interface, such as a video adapter 48. In addition to the monitor 47, the computing system 100 may further include other peripheral output devices such as speakers and printers.

Further, the computing system 100 may operate in a networked environment using logical connections to one or more remote computers The logical connections may be any connection that is commonplace in offices, enterprise-wide computer networks, intranets, and the Internet, such as local area network (LAN) 51 and a wide area network (WAN) 52.

When using a LAN networking environment, the computing system 100 may be connected to the local network 51 through a network interface or adapter 53. When used in a WAN networking environment, the computing system 100 may include a modem 54, wireless router or other means for establishing communication over a wide area network 52, such as the Internet. The modem 54, which may be internal or external, may be connected to the system bus 23 via the serial port interface 46. In a networked environment, program modules depicted relative to the computing system 100, or portions thereof, may be stored in a remote memory storage device 50. The remote memory storage device 50 may include the webpage importance application 61. In one implementation, the webpage importance application 61 may be stored on the hard disk 27, magnetic disk 29, optical disk 31, ROM 24, or RAM 25. The webpage importance application 61 will be described in more detail with reference to FIGS. 2-7 below. It will be appreciated that the network connections shown are exemplary and other means of establishing a communications link between the computers may be used.

It should be understood that the various technologies described herein may be implemented in connection with hardware, software or a combination of both. Thus, various technologies, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the various technologies. In the case of program code execution on programmable computers, the computing device may include a processor, a storage medium readable by the processor (including volatile and non-volatile memory and/or storage elements), at least one input device, and at least one output device. One or more programs that may implement or utilize the various technologies described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

Figure 2:
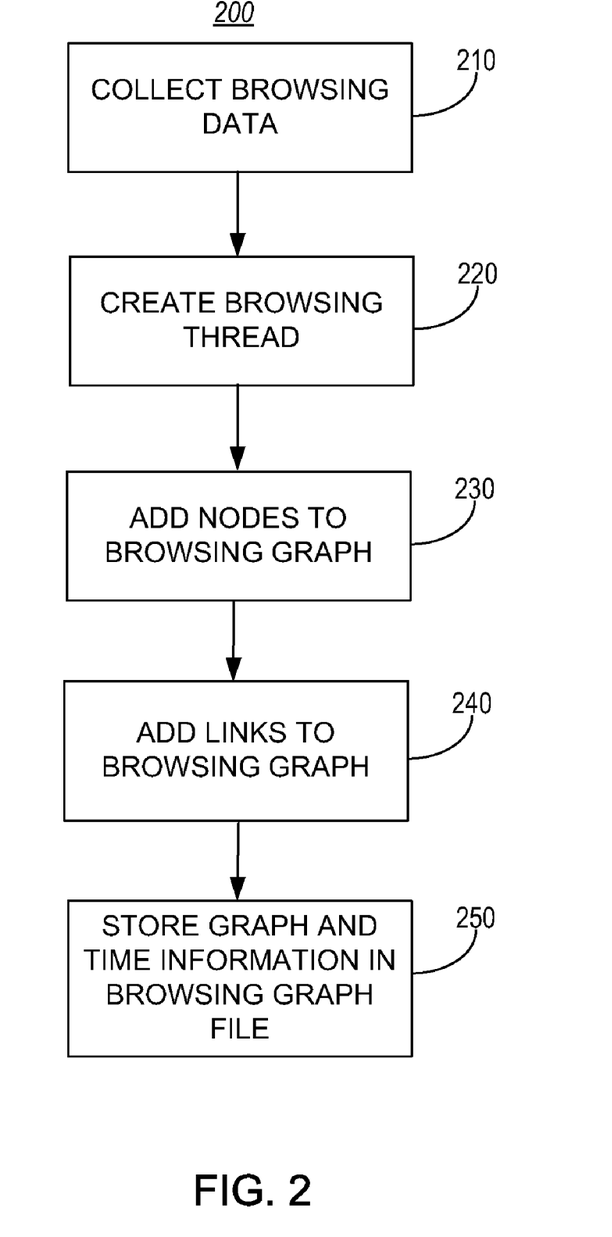
FIG. 2 illustrates a flow diagram of a method for creating a browsing graph in accordance with one or more implementations of various techniques described herein.

FIG. 2 illustrates a flow diagram 200 for creating a browsing graph in accordance with one or more implementations of various techniques described herein. The following description of flow diagram 200 is made with reference to computing system 100 of FIG. 1 in accordance with one or more implementations of various techniques described herein. Additionally, it should be understood that while the operational flow diagram 200 indicates a particular order of execution of the operations, in some implementations, certain portions of the operations might be executed in a different order. In one implementation, the process for creating the browsing graph may be performed by the webpage importance application 61.

At step 210, the webpage importance application 61 may collect web browsing data from the browser application 60 of one or more web users. In one implementation, the browser application 60 may keep a record of the URL addresses (web pages) it may have accessed, the time at which each URL address may have been accessed, and the manner in which the URL address was accessed in a toolbar log. The URL address may have been accessed by a user from a hyperlink on a different webpage or it may have been accessed after a user entered the URL address into the URL address input of the browser application 60.

In one implementation, the webpage importance application 61 may receive a log or record of the web browsing data that occurred on the browser application 60 of one or more users. The webpage importance application 61 may obtain a log from multiple web users in order to create a comprehensive and accurate browsing graph. Prior to receiving the web browsing data from one or more web users, the webpage importance application 61 may receive permission to receive the data from each user of the browser application 60 via legal agreements or the like. In one implementation, the identity of each user may remain anonymous when obtaining the log of the web browsing data from any web user.

At step 220, the webpage importance application 61 may create a browsing thread from the user browsing behavior data obtained from the one or more browser applications 60. In one implementation, the web browsing data of each individual browser application 60 may be separated into different browsing threads. The browsing thread may include a machine identification number to indicate where the web browsing data may have been obtained from, the URL addresses accessed by the browser application 60, the time at which each URL address was accessed, and the means in which each URL address was accessed. In one implementation, a browsing thread may be created for each machine identification number.

At step 230, the webpage importance application 61 may add a node for each URL address listed in each browsing thread created at step 220 to a browsing graph. In one implementation, the browsing graph may initially contain a blank page. A node may be represented on the browsing graph as a circle. In one implementation, each URL address may be represented by only one node in the browsing graph.

At step 240, the webpage importance application 61 may add a line or link from a first node to a second node to represent a hyperlink utilized from a first URL address to a second URL address. The webpage importance application 61 may use the browsing thread created at step 220 to determine where the links should be added on the browsing graph 360. In one implementation, if one hyperlink may have been used multiple times to access a URL address, it may be represented by only one link in the browsing graph. In this case, the webpage importance application 61 may indicate the amount of times in which the URL address may have been accessed by coloring the link that connects to the URL address darker or storing that information in the metadata of the browsing graph file. In one implementation, the link may be represented by an arrow that may point from a node representing a first webpage to a node representing a second webpage accessed by a hyperlink on the first webpage.

At step 250, the webpage importance application 61 may store the browsing graph and the time information pertaining to each accessed URL address in a browsing graph file. In one implementation, the time information may be stored in the metadata portion of the browsing graph file.

Figure 3:
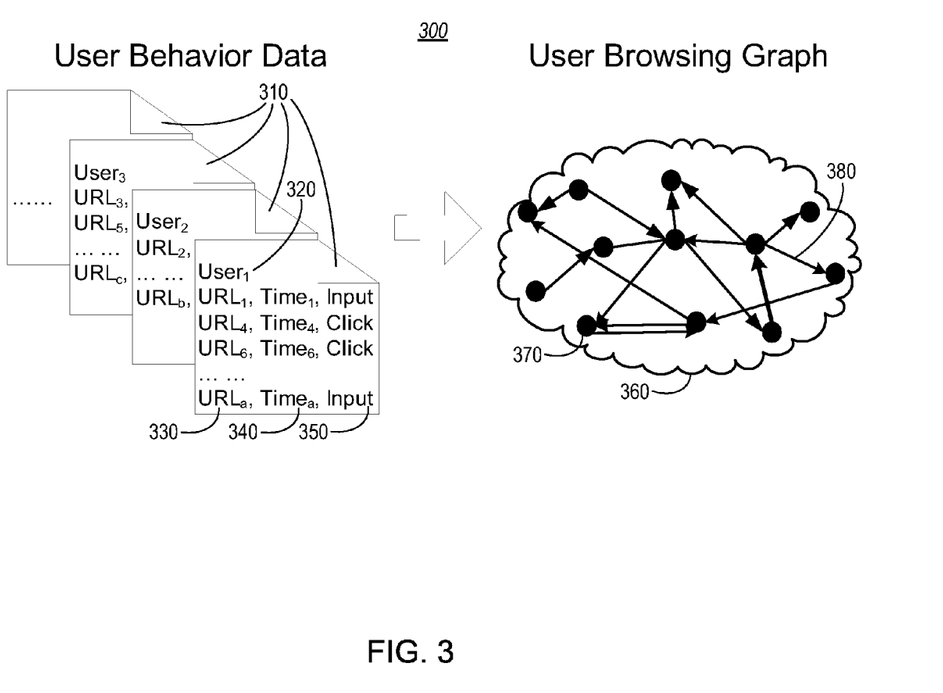
FIG. 3 illustrates a schematic diagram of a browsing thread and a browsing graph in accordance with one or more implementations of various techniques described herein.

FIG. 3 illustrates a schematic diagram 300 of a browsing thread and a browsing graph in accordance with one or more implementations of various techniques described herein. In one implementation, the webpage importance application 61 may create a user browsing thread 310 for each user that the application received information from.

Each user browsing thread 310 may include information pertaining to a user's digital browsing behavior. In one implementation, the user may use the browser application 60 to access various URL addresses on the Internet. The information stored in the user browsing thread 310 may include the user identification 320, the URL address 330, the URL access time stamp 340, and the URL access method 350. In one implementation, the browsing thread 310 may list the URL addresses 330 in chronological order according to their respective URL access time stamps 340. The user identification 320 may be assigned a random number to keep the actual identity of each user anonymous.

The URL address 330 may indicate a URL address that may or may not exist on the Internet. The URL access time stamp 340 may indicate the time in which the URL address 330 was initially accessed or the time in which the URL address 330 was completely loaded on the browser application 60 of the user. The URL access method 350 may include either "input" or "click." "Input" may refer to a user navigating to a URL address by entering the URL address 330 into the browser application 60. "Click" may refer to a user clicking a hyperlink from a webpage that may connect to the URL address 330.

The browsing thread 310 may be used by the webpage importance application 61 to create the browsing graph 360 as described in FIG. 2. In one implementation, the browsing graph 360 may include one or more nodes 370 and one or more arrows 380. Each node 370 may represent each URL address 330 located in the browsing thread 310. Each arrow 380 may represent a hyperlink that existed on one webpage that connected to another webpage. The head of the arrow 380 may be directed at the node 370 that represents the destination of the hyperlink, and the tail of the arrow 380 may be connected to the node 370 that represents the webpage that contained the hyperlink.

In one implementation, the information contained in each browsing thread 310 obtained by the webpage importance application 61 may be represented on a single browsing graph 360. The browsing graph 360 may then more precisely represent a user's random URL address access process, and thus it may be more useful in calculating webpage importance than other methods. The browsing graph 360 may be capable of storing billions of web users' browsing behavior patterns, and these patterns may be interpreted as an implicit voting on webpage importance by each of the web users.

Figure 4:
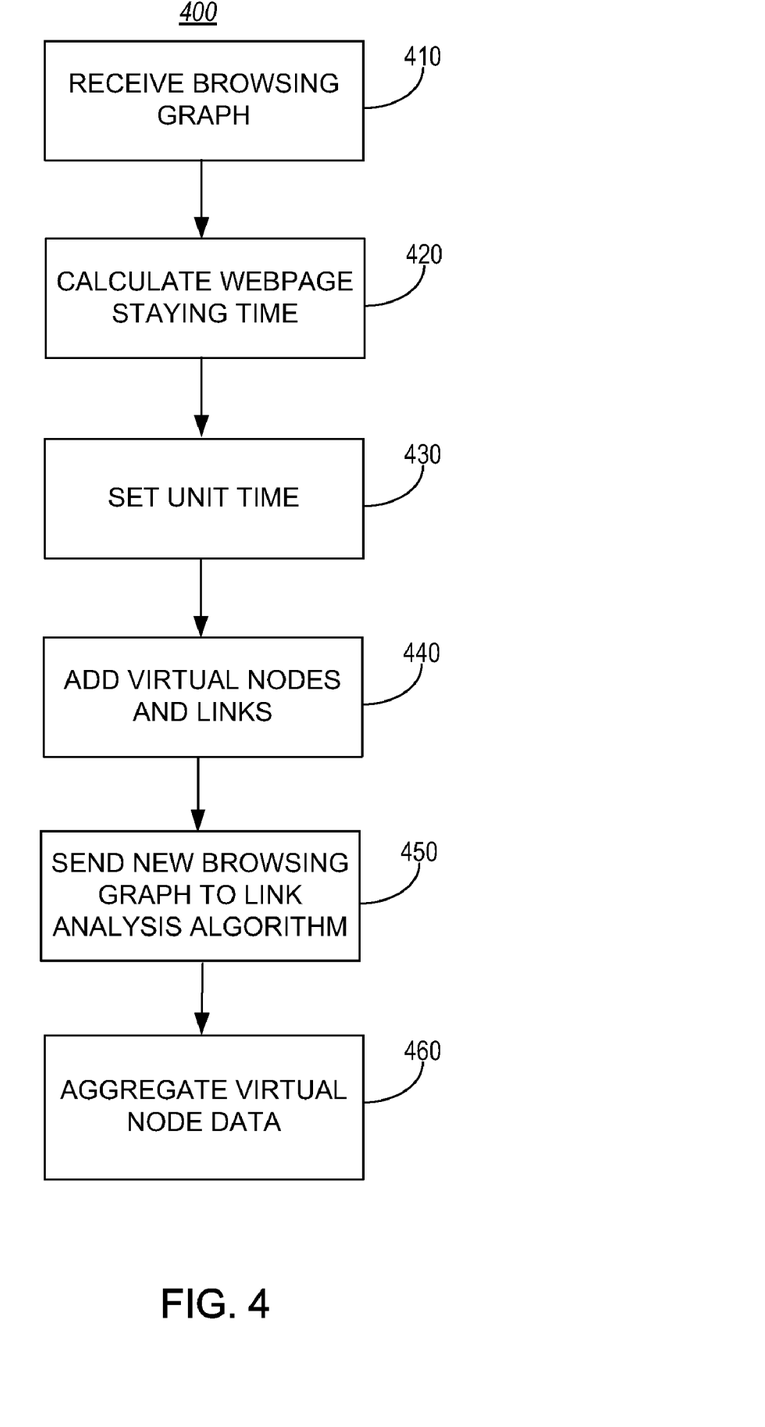
FIG. 4 illustrates a flow diagram of a method for creating a browsing graph with virtual nodes in accordance with one or more implementations of various techniques described herein.

FIG. 4 illustrates a flow diagram of a method 400 for creating a browsing graph with virtual nodes to model the web browsing behavior of one or more web users in accordance with one or more implementations of various techniques described herein. The virtual nodes may be added to the browsing graph 360 to represent the amount of time in which one or more web users stayed on a particular webpage. Additionally, it should be understood that while the operational flow diagram 400 indicates a particular order of execution of the operations, in some implementations, certain portions of the operations might be executed in a different order. In one implementation, the process for creating the browsing graph may be performed by the webpage importance application 61.

At step 410, the webpage importance application 61 may receive a browsing graph file that may have been created as described in FIG. 3. The browsing graph file may contain the browsing graph 360 and the corresponding time data of the browsing graph 360.

At step 420, the webpage importance application 61 may calculate a time in which each webpage, represented by a node in the browsing graph 360, was being accessed. The time in which a webpage was being accessed may refer to the time in which a user navigates to a webpage and remains on that webpage. The time in which each webpage was being accessed may be determined using the time data contained in the browsing graph file. In one implementation, the webpage importance application 61 may obtain the time at which a webpage was accessed from the browsing graph file and subtract the time at which the previous webpage was accessed. The difference between these two times may indicate the time in which that particular webpage was being accessed. In one implementation, the time in which a webpage was being accessed may be referred to as a webpage staying time.

At step 430, the webpage importance application 61 may set a unit time, or unit of time, to describe an amount of time in which one or more web users may have stayed on a webpage. The unit time may be determined to be a minimum amount of time in which a webpage was being accessed. Each node 370 may correspond to the unit time in which one or more web users were accessing the webpage represented by the node 370. For example, if the webpage importance application 61 sets the unit time to be one second, each node 370 on the browsing graph 360 may represent one second of the time in which a web user was accessing the webpage.

At step 440, the webpage importance application 61 may add one or more virtual nodes to the browsing graph 360 to accurately reflect the time in which the webpage was being accessed by each web user. The virtual nodes may correspond to a specific node such that they may both represent the same webpage and the same unit time in which a webpage was being accessed. Therefore, the virtual node and the node 370 may be illustrated on the graph using similar icons. The webpage importance application 61 may then determine a number of virtual nodes that may need to be added to accurately represent the total time that one or more web users may have been accessing a webpage represented by a specific node. For example, if the webpage importance application 61 established that the unit of time was one second at step 430, each node 370 or virtual node may represent one second of the time in which a web user was accessing that particular webpage. If the time data from the browsing graph file indicated that one or more web users were accessing webpage 'A' for a total of 3 seconds, the webpage importance application 61 may add two virtual nodes in addition to the node 370 to indicate that the web users were accessing webpage 'A' for three seconds.

After adding the virtual nodes, the webpage importance application 61 may add a link from the node 370 to the first virtual node that may have been created to represent the same webpage of the node 370. The webpage importance application 61 may also add a link from the first virtual node to a second virtual node, from the second virtual node to a third virtual node, and so on until each virtual node is connected to by one link. The virtual nodes and links may represent a web user's behavior such that he may stay on a webpage for a unit time and then click a hyperlink that may connect the same webpage. In one implementation, the link may be represented on the browsing graph 360 as a line or an arrow. An arrow may be directed from the node 370 to a virtual node to represent the time in which a web user was accessing the webpage.

At step 450, the webpage importance application 61 may send the browsing graph with virtual nodes to a link analysis algorithm. In one implementation, the link analysis algorithm may be the PageRank® algorithm. The PageRank® algorithm may be used to determine the rank of each webpage based on the number of links from which each webpage may be accessed. Since the number of links may also correlate to the time in which a web user stayed on a particular webpage, the link analysis algorithm may now account for the time in which a web user stays on a webpage in its calculations. The link analysis algorithm may calculate the importance for each node and virtual node in the browsing graph 360.

At step 460, the webpage importance application 61 may aggregate the importance value results for each virtual node that may represent the same webpage with the importance value of its corresponding node. As a result, the link analysis algorithm may account for the time in which a web user stayed on each webpage by evaluating the links contained in the browsing graph.

Figure 5:
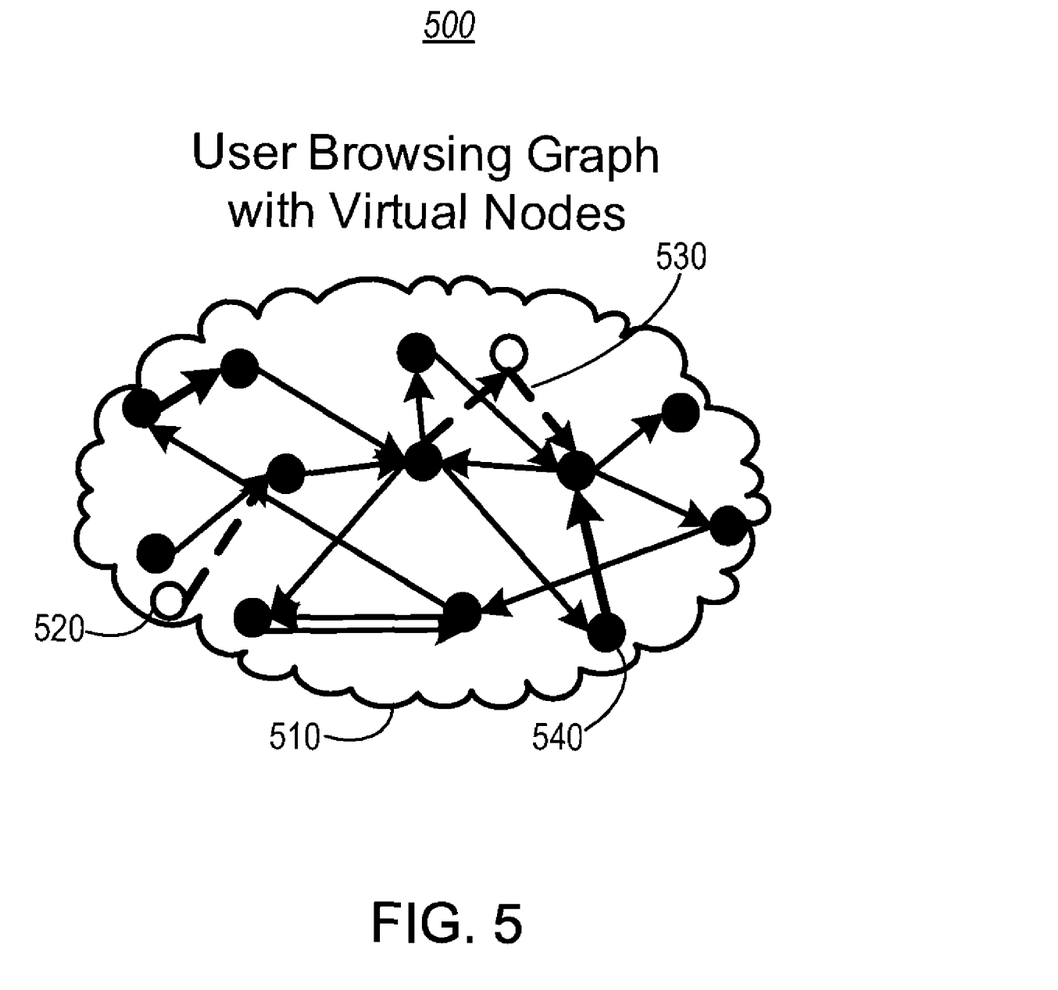
FIG. 5 illustrates a schematic diagram of a browsing graph with virtual nodes in accordance with one or more implementations of various techniques described herein.

FIG. 5 illustrates a schematic diagram 500 of a browsing graph with virtual nodes in accordance with one or more implementations of various techniques described herein.

The browsing graph 510 may have one or more virtual nodes 520 to represent a web user's staying time on the webpage. In addition to the virtual nodes 520, the browsing graph with virtual nodes 510 may have one or more virtual links 530 connected to the node 540 or another virtual node 520. The node 540 may correspond to the node 370 as described in FIG. 3. The browsing graph 510 will be described in more detail with reference to FIG. 6 below.

Figure 6:
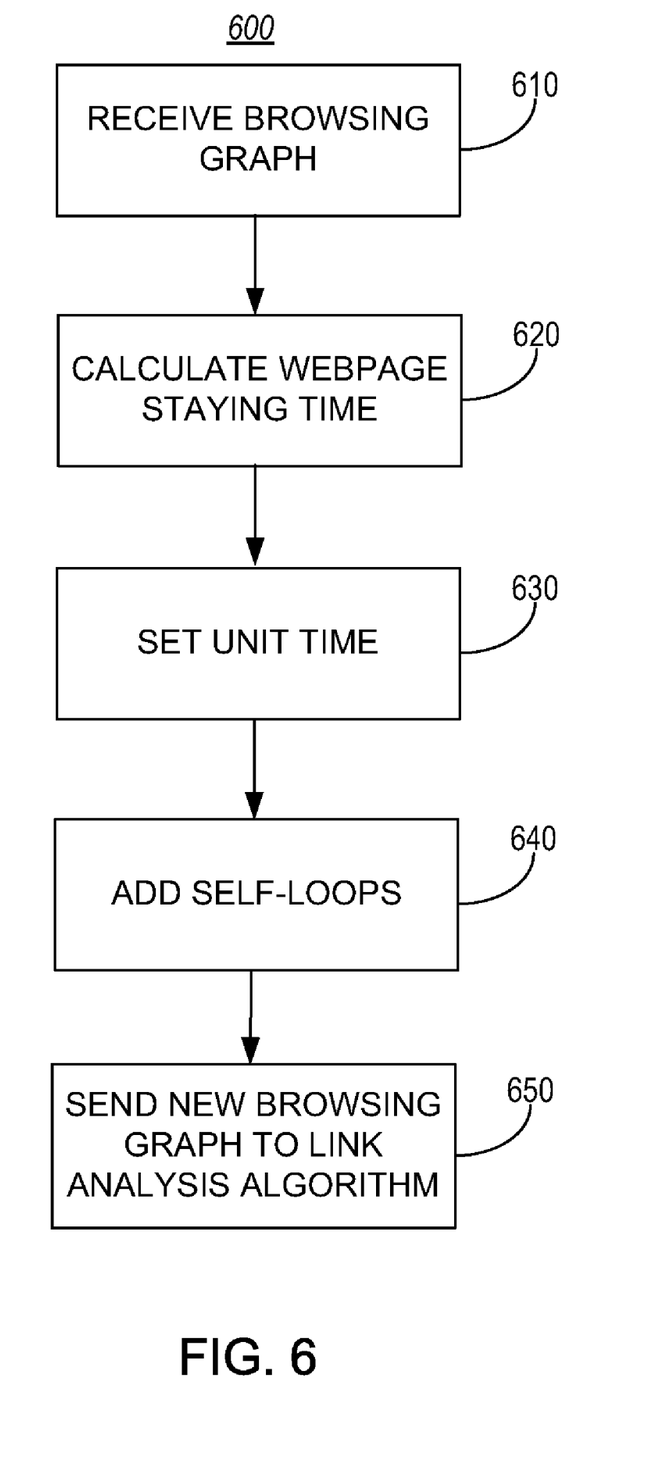
FIG. 6 illustrates a flow diagram of a method for creating a browsing graph with self-loops in accordance with one or more implementations of various techniques described herein.

FIG. 6 illustrates a flow diagram of a method 600 that may be used to calculate webpage importance using a browsing graph having virtual nodes contained therein in accordance with one or more implementations of various techniques described herein. The following description of the method 600 is made with reference to computing system 100 of FIG. 1 in accordance with one or more implementations of various techniques described herein.

At step 610, the webpage importance application 61 may receive a browsing graph file. The browsing graph file may contain the browsing graph 360 and time data for each accessed webpage.

At step 620, the webpage importance application 61 may calculate a time in which each webpage, represented by a node in the browsing graph 360, was being accessed. In one implementation, the webpage importance application 61 may obtain the time at which a webpage was accessed from the browsing graph file and subtract the time at which the webpage that was previously accessed. The difference between these two times may be used as the time in which a webpage was being accessed.

At step 630, the webpage importance application 61 may set a unit time to describe a time in which a webpage was being accessed by one or more web users. The unit time may be determined using a similar process as described in step 420 on FIG. 4.

At step 640, the webpage importance application 61 may add one or more self-loops to the nodes 370 on the browsing graph 360 to represent the time in which a webpage was being accessed by one or more web users. The self-loop may be represented by an arrow that starts and ends at the same node 370. The webpage importance application 61 may first determine the number of self-loops it may need to add for each node 370. Since each node 370 may represent the unit time defined in step 630, the number of self-loops that may need to be added may relate to the time in which one or more web users stayed on the webpage represented by the node 370. For example, if a unit of time was set at one second and a web user remained on webpage 'A' for 3 seconds, the webpage importance application 61 may add two self-loops 620 to indicate that the user was on webpage 'A' for three seconds. Since each node 370 may indicate the unit time specified at step 530, the addition of self-loops 620 may be considered to represent a web user clicking a hyperlink on the webpage represented by the node 370 to the same webpage. Therefore, the time in which a web user may have stayed on a webpage may be represented by the number of times the node may have been accessed via a hyperlink, self-loop, or by entering the URL address into the browser application 60. After determining the number of self-loops 620 may be required, the webpage importance application 61 may the required number of self-loops 620 to one or more nodes 370 on the browsing graph 360 to accurately represent the time in which one or more web users may have been accessing a webpage.

At step 650, the webpage importance application 61 may send the altered browsing graph with self-loops to a webpage importance algorithm. In one implementation, the webpage importance algorithm may be a link analysis algorithm. The link analysis algorithm may determine the rank of each webpage based on the number of links in which each webpage may be accessed from. In this implementation, the link analysis algorithm may calculate the importance for each node 370 in the altered browsing graph with self-loops. The importance of each node 370 may correspond to the importance of the webpage represented by the node 370.

Figure 7:
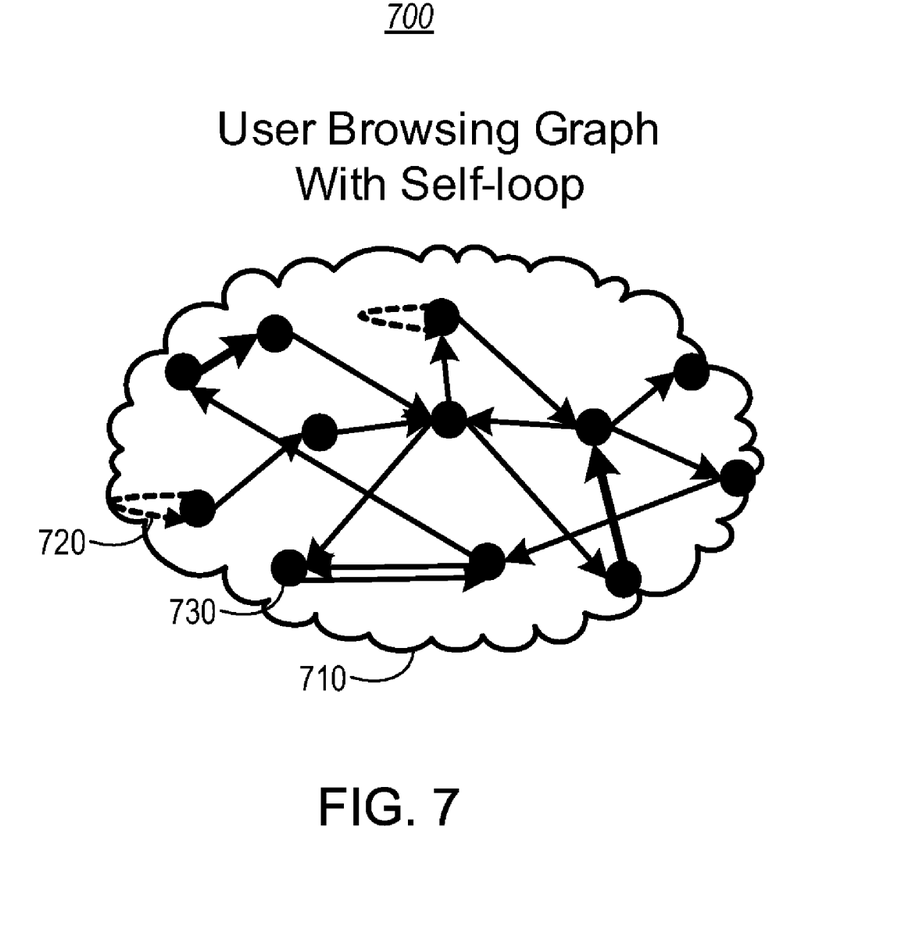
FIG. 7 illustrates a schematic diagram of a browsing graph with self-loops in accordance with one or more implementations of various techniques described herein.

FIG. 7 illustrates a schematic diagram 700 of a browsing graph with self-loops in accordance with one or more implementations of various techniques described herein.

The browsing graph with self-loops 710 may have one or more self-loops 720 to be used to indicate a web user's staying time on the webpage. The self-loop 720 may start and end at the same node 730. The node 730 may correspond to the node 370 as described in FIG. 3.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for creating a graph representing web browsing behavior, comprising using a computing device to perform actions comprising:
   receiving web browsing behavior data from one or more web browsers;
   adding a node on the graph for each web page listed in the web browsing behavior data;
   for every transition from one web page to another web page in the web browsing behavior data, adding a directional link between the corresponding nodes of the graph, each directional link representing a hyperlink on one of the web pages that was followed to another one of the web pages;
   for each node, calculating a total amount of time that each corresponding web page was accessed based on the web browsing behavior data;
   for all web pages, evaluating the total amount of time each web page was accessed to determine a common unit of time for use across all nodes of the graph and for each node, determining a number of units of time in the calculated total amount of time for each corresponding web page;
   for each node, for each unit of time above one, adding a corresponding virtual node to the graph such that every node in the graph represents the same unit of time; and
   for each virtual node, adding one or more directional links from the virtual node to one or more other nodes, each of the added directional links matching the directional links of the corresponding node from which the virtual node was created.

2. The method of claim 1, wherein the web browsing behavior data comprises:
   one or more machine identification numbers;
   a list of web pages that have been accessed;
   a time in which each web page was accessed; and
   a method in which each web page was accessed.

3. The method of claim 1, wherein calculating the amount of time comprises:
obtaining a time in which a first web page was accessed;
obtaining a time in which a second web page was accessed, wherein the second webpage was accessed immediately after the first web page; and
subtracting the time in which the first web page was accessed from the time in which the second web page was accessed.

4. The method of claim 1, wherein each virtual node corresponds to a node on the graph.

5. The method of claim 1, wherein adding the virtual nodes to the graph based on the number of units of time comprises:
calculating a number of virtual nodes needed to represent the calculated amount of time; and
adding the number of virtual nodes to the graph.

6. The method of claim 1, further comprising:
sending the graph to a link analysis algorithm;
receiving one or more importance values for each node on the graph;
correlating the importance values to the web page represented by each node; and
aggregating the importance values for each identical web page.

7. A computer system, comprising:
a processor; and
a memory comprising program instructions executable by the processor to:
receive web browsing behavior data from one or more web browsers;
add a node on the graph for each web page listed in the web browsing behavior data;
add a directional link between corresponding nodes of the graph for every transition from one web page to another web page in the web browsing behavior data, and wherein each directional link represents a hyperlink on one of the web pages that was followed to another one of the web pages;
for each node, calculate a total amount of time that each corresponding web page was accessed based on the web browsing behavior data;
for all web pages, evaluating the total amount of time each web page was accessed to determine a common unit of time for use across all nodes of the graph and for each node, determine a number of units of time in the calculated total amount of time for each corresponding web page; and
for each node, for each unit of time above one, add a self loop to that node, each self loop representing a virtual hyperlink connecting the corresponding webpage to itself such that every node in the graph includes a total number of links, including the self loops, that is equivalent to the number of units of time for each corresponding web page.

8. The computer system of claim 7, wherein the web browsing behavior data comprises:
one or more machine identification numbers;
a list of web pages that have been accessed;
a time in which each web page was accessed; and
a method in which each web page was accessed.

9. The computer system of claim 7, wherein the program instructions executable by the processor to calculate the amount of time are configured to:
obtain a time in which a first web page was accessed;
obtain a time in which a second web page was accessed, wherein the second webpage was accessed immediately after the first web page; and
subtract the time in which the first web page was accessed from the time in which the second web page was accessed.

10. The computer system of claim 7, wherein the program instructions executable by the processor to add the self loops to the graph based on the number of units of time are configured to:
calculate a number of self loops needed to represent the calculated amount of time; and
add the number of self loops to the graph.

11. The computer system of claim 7, wherein the memory further comprises program instructions executable by the processor to:
send the graph to a link analysis algorithm;
receive one or more importance values for each node on the graph; and
correlate the importance values to the web page represented by each node.

12. A computer-readable medium, which does not consist of a modulated data signal or carrier wave, having stored thereon computer-executable instructions which, when executed by a computer, cause the computer to:
receive web browsing behavior data from one or more web browsers;
create a graph representing web browsing behavior using the web browsing behavior by adding a node on the graph for each web page listed in the web browsing behavior data and adding a directional link between corresponding nodes of the graph for every transition from one web page to another web page in the web browsing behavior data, and wherein each directional link represents a hyperlink on one of the web pages that was followed to another one of the web pages;
for each node, calculate a total amount of time that each corresponding web page was accessed based on the web browsing behavior data;
for all web pages, evaluating the total amount of time each web page was accessed to determine a common unit of time for use across all nodes of the graph and for each node, determine a number of units of time in the calculated total amount of time for each corresponding web page;
for each node, for each unit of time above one, adding a corresponding virtual node to the graph such that every node in the graph represents the same unit of time;
for each virtual node, add a directional link to the graph that matches the directional link of the corresponding node from which the virtual node was created; and
calculate a web page importance for each web page listed in the web browsing behavior data based on the graph.

13. The computer-readable medium of claim 12, wherein the directional links added for each unit of time above one are self loops added to the corresponding node, and which represent a virtual hyperlink connecting a webpage to itself.

14. The computer-readable medium of claim 12, wherein the instructions that cause the computer to calculate the web page importance are configured to:
send the graph to a link analysis algorithm;
receive one or more importance values for each node on the graph;
correlate the importance values to the web page represented by each node; and
aggregate the importance values for each identical web page.

* * * * *